(12) United States Patent
Mao et al.

(10) Patent No.: US 11,089,193 B2
(45) Date of Patent: Aug. 10, 2021

(54) CAMERA MODULE, MOBILE TERMINAL AND METHOD OF CONTROLLING CAMERA MODULE

(71) Applicant: VIVO MOBILE COMMUNICATION CO., LTD., Chang'an Dongguan (CN)

(72) Inventors: Xing Mao, Chang'an Dongguan (CN); Peng Wang, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 64 days.

(21) Appl. No.: 16/625,905

(22) PCT Filed: May 3, 2018

(86) PCT No.: PCT/CN2018/085451
§ 371 (c)(1),
(2) Date: Dec. 23, 2019

(87) PCT Pub. No.: WO2019/001136
PCT Pub. Date: Jan. 3, 2019

(65) Prior Publication Data
US 2020/0154017 A1 May 14, 2020

(30) Foreign Application Priority Data
Jun. 26, 2017 (CN) .......................... 201710495863.4

(51) Int. Cl.
*H04N 5/225* (2006.01)
*H04M 1/02* (2006.01)
*H04N 5/232* (2006.01)

(52) U.S. Cl.
CPC ........ *H04N 5/2257* (2013.01); *H04M 1/0264* (2013.01); *H04N 5/2254* (2013.01); *H04N 5/232* (2013.01); *H04M 2250/52* (2013.01)

(58) Field of Classification Search
CPC .... H04N 5/2254; H04N 5/2257–2259; H04M 1/0264
(Continued)

(56) References Cited

U.S. PATENT DOCUMENTS 6,963,375 B1   11/2005  Lundberg
7,071,973 B1   7/2006   Yoshioka et al.
(Continued)

FOREIGN PATENT DOCUMENTS

CN    101493634 A    7/2009
CN    201421406 Y    3/2010
(Continued)

OTHER PUBLICATIONS

1st Chinese Office Action for Chinese Application No. 201710495836.4, dated Jul. 12, 2018 (dated Jul. 12, 2018)—5 pages (English translation—7 pages).
(Continued)

*Primary Examiner* — Anthony J Daniels
(74) *Attorney, Agent, or Firm* — Culhane Meadows PLLC; Stephen J. Weed

(57) ABSTRACT

A camera module, a mobile terminal and a method of controlling a camera module are provided. The camera module includes a module support, a driving device, a first reflector, a second reflector and a lens module. The first reflector, the second reflector and the lens module are in the module support. Based on the position arrangement and the connection of the multiple components including the module support, the two reflectors, the lens module and the driving device, the lens module alternately collects light passing through the first light inlet and light passing through the second light inlet, so that the camera module alternately has the function of the front camera and the function of the
(Continued)

rear camera, and the camera module has the same high quality imaging effect in all directions.

13 Claims, 6 Drawing Sheets

(58) Field of Classification Search
USPC .......................................... 348/335, 340, 344
See application file for complete search history.

(56) References Cited

U.S. PATENT DOCUMENTS

| | | | | |
|---|---|---|---|---|
| 7,170,558 | B2 * | 1/2007 | Yokota | H04N 5/2254 |
| | | | | 348/337 |
| 7,889,435 | B2 * | 2/2011 | Seo | G02B 15/06 |
| | | | | 359/672 |
| 9,507,241 | B1 * | 11/2016 | Schantz | G03B 11/043 |
| 2005/0139672 | A1 | 6/2005 | Johnson et al. | |
| 2007/0070529 | A1 | 3/2007 | Chen | |
| 2008/0185526 | A1 | 8/2008 | Horak et al. | |
| 2008/0266443 | A1 | 10/2008 | Lee | |
| 2009/0002797 | A1 | 1/2009 | Kwong et al. | |
| 2009/0009650 | A1 * | 1/2009 | Liu | G02B 13/0055 |
| | | | | 348/340 |
| 2014/0055624 | A1 * | 2/2014 | Gaines | G02B 5/08 |
| | | | | 348/207.1 |
| 2014/0085716 | A1 * | 3/2014 | Owen | G02B 23/08 |
| | | | | 359/402 |
| 2015/0092102 | A1 * | 4/2015 | Chan | H04N 5/2254 |
| | | | | 348/360 |
| 2017/0272650 | A1 * | 9/2017 | Lee | H04N 5/23229 |
| 2018/0035031 | A1 * | 2/2018 | Kwak | H04N 5/2254 |
| 2018/0364494 | A1 * | 12/2018 | Masahiro | H04N 5/2259 |
| 2019/0265461 | A1 | 8/2019 | Xie et al. | |

FOREIGN PATENT DOCUMENTS

| | | |
|---|---|---|
| CN | 203136021 U | 8/2013 |
| CN | 203136024 U | 8/2013 |
| CN | 203800987 U | 8/2014 |
| CN | 104298050 A | 1/2015 |
| CN | 104980541 A | 10/2015 |
| CN | 105704355 A | 6/2016 |
| CN | 106375502 A | 2/2017 |
| CN | 106550181 A | 3/2017 |
| CN | 107172336 A | 9/2017 |
| JP | 2001100308 A | 4/2001 |
| WO | 2006134802 A1 | 12/2006 |

OTHER PUBLICATIONS

Extended European Search Report for European Application No. 18822969.4, dated Apr. 14, 2020 (dated Apr. 14, 2020)—7 pages.
International Search Report and Written Opinion for International Application No. PCT/CN2018/085451, dated Jan. 9, 2020 (dated Jan. 9, 2020)—10 pages (English translation—7 pages).

* cited by examiner

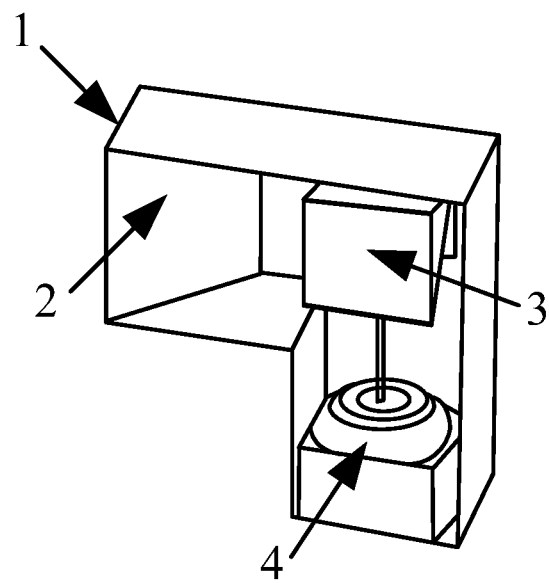

Fig. 12

| controlling, with the driving device, the second reflector to rotate to a first rotation position to make the second reflector face the first reflector, and collecting light passing through the first light inlet with the lens module | ∿101 |
|---|---|

↓

| controlling, with the driving device, the second reflector to rotate to a second rotation position to make the second reflector face the second light inlet, and collecting light passing through the second light inlet with the lens module | ∿102 |
|---|---|

CAMERA MODULE, MOBILE TERMINAL AND METHOD OF CONTROLLING CAMERA MODULE

CROSS-REFERENCE TO RELATED APPLICATION

This application is the U.S. national phase of PCT Application No. PCT/CN2018/085451 filed on May 3, 2018, which claims a priority to Chinese Patent Application No. 201710495863.4 filed on Jun. 26, 2017, the disclosures of which are incorporated in their entirety by reference herein.

TECHNICAL FIELD

The present disclosure relates to the field of communication, in particular to a camera module, a mobile terminal and a method of controlling a camera module.

BACKGROUND

With the continuous development of terminal functions, a camera has become an indispensable electronic device in a terminal product such as mobile phone and tablet computer. Currently, in order to realize camera function and video call function for a terminal such as mobile phone and tablet computer, a front camera and a rear camera need to be arranged on the terminal.

The camera function and the video call function of the terminal are achieved by installing the front camera and the rear camera, however, the terminal has the problems as follows. The front camera and the rear camera each need independent manufacture of camera components, such as a light sensor, a lens, a printed circuit board, and a connector, resulting in complex manufacturing and high cost of the terminal. The two set of camera components of the front camera and the rear camera each need to occupy an independent spatial position, thereby reducing the spatial position of other devices of the terminal and resulting in relatively low space utilization of the terminal. Based on consideration of cost of the terminal, performances such as pixels, zoom adjustment and optical image stabilization of the front camera are generally lower than those of the rear camera, and the performance of the front camera is poor.

SUMMARY

The present disclosure provides a camera module, to solve the problems such as complex manufacturing, high cost, low space utilization of a terminal and poor performance of the front camera in the related technologies, which are caused by arranging the front camera and the rear camera.

In a first aspect, a camera module is provided. The camera module includes a module support, a driving device, a first reflector, a second reflector and a lens module. The first reflector, the second reflector and the lens module are in the module support.

A first light inlet is arranged on a first sidewall of the module support, a second light inlet is arranged on a second sidewall of the module support, and the first sidewall and the second sidewall are opposite to each other.

The first reflector is arranged at the first light inlet, a mirror surface of the first reflector is at a first preset angle with the first sidewall, the second reflector is arranged at the second light inlet, a mirror surface of the second reflector is at a second preset angle with a first horizontal plane perpendicular to the first sidewall, the lens module is arranged on a second horizontal plane perpendicular to the first sidewall, a lens of the lens module faces the mirror surface of the second reflector.

The second reflector is connected to the driving device, and the driving device is configured to control the second reflector to rotate about a central axis of the lens module.

In the case that the mirror surface of the second reflector faces the first reflector, light passing through the first light inlet is sequentially reflected by the first reflector and the second reflector, and transmitted to the lens module.

In the case that the mirror surface of the second reflector faces the second light inlet, light passing through the second light inlet is reflected by the second reflector and transmitted to the lens module.

In a second aspect, a mobile terminal is provided. The mobile terminal includes the camera module as described above.

In a third aspect, a method of controlling the above camera module is provided. The method includes:

controlling, with the driving device, the second reflector to rotate to a first rotation position to make the second reflector face the first reflector, and collecting light passing through the first light inlet with the lens module; and controlling, with the driving device, the second reflector to rotate to a second rotation position to make the second reflector face the second light inlet, and collecting light passing through the second light inlet with the lens module.

Thus, in the embodiments of the present disclosure, based on the position arrangement and the connection of the multiple components including the module support, the two reflectors, the lens module and the driving device, the lens module can alternately collect the light passing through the first light inlet and the light passing through the second light inlet, so that the camera module alternately has the function of the front camera and the function of the rear camera, and the camera module has the same high quality imaging effect in all directions. Moreover, the camera module has the advantages of simple structure, low manufacturing complexity, high integration, high product yield, short manufacturing cycle, low cost, easy debugging and maintenance, etc.

The present disclosure also provides a mobile terminal, including the camera module as described above. Based on the advantages of the camera module, the mobile terminal provided with the single camera module has a function of a front camera and a function of a rear camera, where the front camera can have the same high performance indicators as the rear camera, such as resolution and optical image stabilization. In this way, the cost of the terminal is reduced, the space of the terminal is saved, and the mobile terminal has the advantages of simple structure, low manufacturing complexity, high integration, high product yield, short manufacturing cycle, easy debugging and maintenance, etc.

BRIEF DESCRIPTION OF THE DRAWINGS

To better clarify technical solutions of embodiments of the present disclosure, drawings used in description of the embodiments of the present disclosure are briefly introduced hereinafter. Apparently, the described drawings merely illustrate a part of the disclosed embodiments. A person ordinary skilled in the art can obtain other drawings based on the described drawings without any creative efforts.

FIG. 12 shows a schematic overall view of a camera module using a rear camera function according to some embodiments of the present disclosure; and FIG. 13 is a flowchart of a method of controlling a camera module according to some embodiments of the present disclosure.

DESCRIPTION OF THE REFERENCE SIGNS 1. module support; 2. first reflector; 3. second reflector; 4. lens module; a. first light inlet; b. second light inlet.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

Embodiment 1

Figure 1:
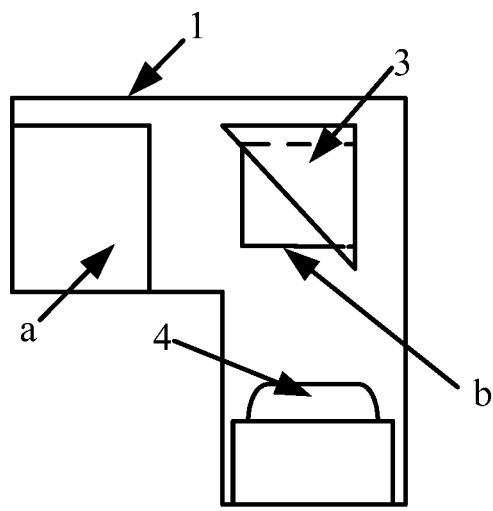
FIG. 1 shows a schematic front view of a camera module according to some embodiments of the present disclosure.
Figure 2:
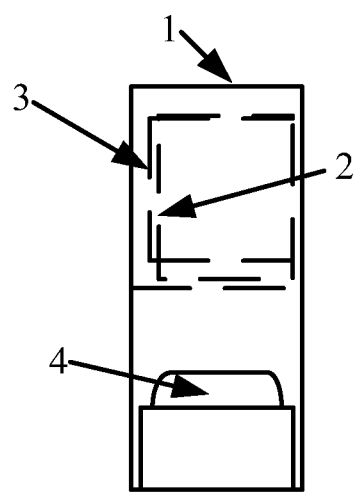
FIG. 2 shows a schematic rear view of a camera module according to some embodiments of the present disclosure.
Figure 3:
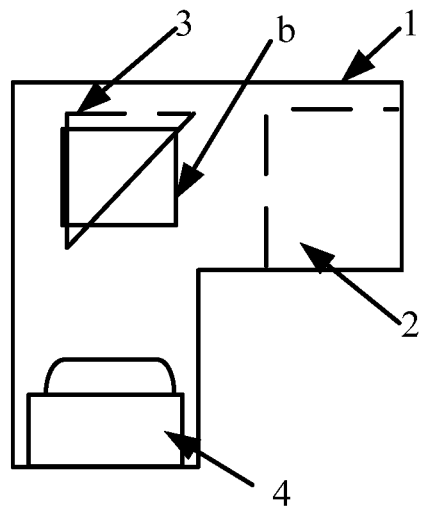
FIG. 3 shows a schematic right view of a camera module according to some embodiments of the present disclosure.
Figure 4:
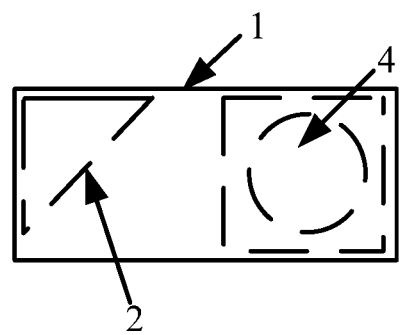
FIG. 4 shows a schematic top view of a camera module according to some embodiments of the present disclosure.

FIGS. 1 to 4 are schematic structural views of a camera module according to some embodiments of the present disclosure. As shown in FIGS. 1 to 4, the camera module provided by the embodiments of the present disclosure includes: a module support 1, a driving device (not shown), a first reflector 2, a second reflector 3 and a lens module 4. The first reflector 2, the second reflector 3 and the lens module 4 are arranged in the module support 1. A first light inlet a is arranged on a first sidewall of the module support 1, a second light inlet b is arranged on a second sidewall of the module support 1, the first sidewall and the second sidewall are arranged opposite to each other, for example, arranged in parallel to each other.

The first reflector 2 is arranged at the first light inlet a, and a mirror surface of the first reflector 2 is at a first preset angle relative to the first sidewall. The second reflector 3 is arranged at the second light inlet b, and a mirror surface of the second reflector 3 is at a second preset angle relative to a first horizontal plane perpendicular to the first sidewall. The lens module 4 is arranged on a second horizontal plane perpendicular to the first sidewall, a lens of the lens module 4 faces the mirror surface of the second reflector 3.

The second reflector 3 is connected to the driving device, and the driving device is configured to control the second reflector 3 to rotate about a central axis of the lens module 4. In the case that the mirror surface of the second reflector 3 faces the first reflector 2, light passing through the first light inlet a is sequentially reflected by the first reflector 2 and the second reflector 3, and finally transmitted to the lens module 4. In the case that the mirror surface of the second reflector 3 faces the second light inlet b, light passing through the second light inlet b is reflected by the second reflector 3 and finally transmitted to the lens module 4.

The module support 1 may be provided with a third sidewall. The third sidewall is parallel to the first horizontal plane. The lens module 4 may be arranged on the third sidewall.

The mirror surface of the first reflector 2 and the mirror surface of the second reflector 3 may have various shapes such as circular, rectangular, square, and the like. A size of the mirror surface of the first reflector 2 may match a size of the first light inlet a, or may be larger than the size of the first light inlet a. Similarly, a size of the mirror surface of the second reflector 3 may match a size of the second light inlet b, or may be larger than the size of the second light inlet b.

When the first reflector 2 and the second reflector 3 are placed in the module support 1, a line connecting a center point of the first reflector 2 and a center point of the second reflector 3 may be perpendicular to and intersect with an axis of the first light inlet a, an axis of the second light inlet b, and a central axis of the lens module 4. In the case that the size of the mirror surface is larger than the size of the light inlet, the line connecting the center point of the first reflector 2 and the center point of the second reflector 3 may not intersect the axis of the first light inlet a, the light passing through the first light inlet a illuminates a side of the first reflector 2 instead of the central region, and similarly, the light passing through the second light inlet b may illuminate a side of the second reflector 3 instead of the central region. All the above-mentioned placement positions of the reflectors can realize the light transmission described in the embodiments of the present disclosure, and placement positions of the reflectors may be arranged according to the actual situations.

As shown in FIGS. 1 to 4, if the second reflector 3 faces the second light inlet b, the second reflector 3 may be rotated by 90° around the central axis of the lens module 4, so that the second reflector 3 faces the first reflector 2, thereby achieving switch of functions of the camera module.

In the camera module, the mirror surface of the first reflector 2 is at the first preset angle with the first sidewall, and the mirror surface of the second reflector 3 is at the second preset angle with the first horizontal plane perpendicular to the first sidewall. The first preset angle and the second preset angle may be set according to specific conditions. Specifically, the first preset angle may be 45°, and the second preset angle may be 45°.

The module support may have various structures in various embodiments such as an L-shaped structure. In the case that the module support has the L-shaped structure, the first reflector 2 and the second reflector 3 may be located in a horizontal support, and the lens module 4 may be located in a vertical support.

The driving device is connected to the second reflector 3 to control the rotation of the second reflector 3. Specifically, the second reflector may be fixed to a support structure, such as a triangular support. The support structure is connected to a rotation shaft of the driving device. When the driving device controls the rotation shaft to rotate, the rotation shaft drives the second reflector 3 to rotate.

Based on the position arrangement and the connection of the multiple components including the module support, the two reflectors, the lens module and the driving device, the lens module alternately collects the light passing through the first light inlet and the light passing through the second light inlet, so that the camera module alternately has the function of the front camera and the function of the rear camera, and the camera module has the same high quality imaging effect in all directions. Moreover, the camera module has the advantages of simple structure, low manufacturing complexity, high integration, high product yield, short manufacturing cycle, low cost, and easy debugging and maintenance, etc.

Figure 5:
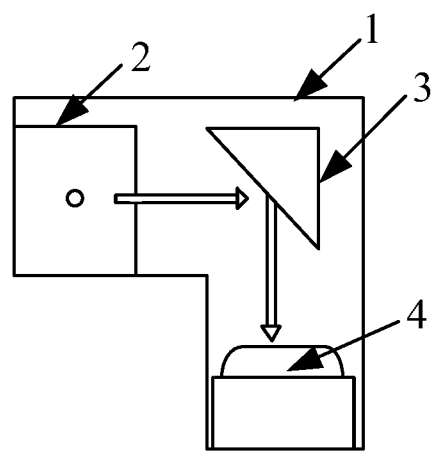
FIG. 5 shows a schematic front view of a camera module using a front camera function according to some embodiments of the present disclosure.
Figure 6:
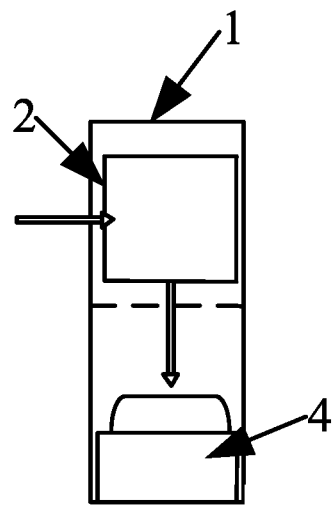
FIG. 6 shows a schematic right view of a camera module using a front camera function according to some embodiments of the present disclosure.
Figure 7:
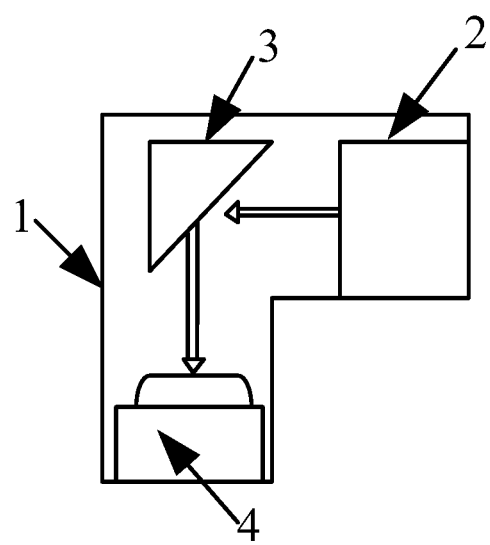
FIG. 7 shows a schematic rear view of a camera module using a front camera function according to some embodiments of the present disclosure.
Figure 8:
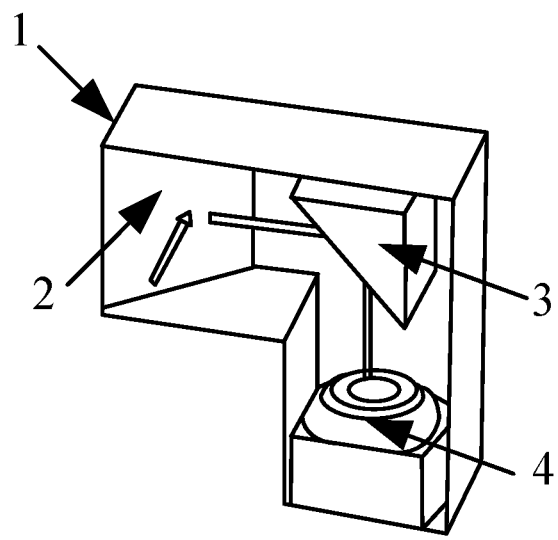
FIG. 8 shows a schematic overall view of a camera module using a front camera function according to some embodiments of the present disclosure.

FIGS. 5 to 8 are schematic structural views of a camera module using a front camera function according to some embodiments of the present disclosure. The directions of the arrows in FIGS. 5 to 8 are the directions of light transmission.

As shown in FIGS. 5 to 8, the first light inlet a is set to be a front viewing frame of the terminal, and the camera module has a front camera function with such a structure. The second reflector 3 faces the first reflector 2. After the light passes through the first light inlet a, the light is reflected by the first reflector 2 and the second reflector 3 in sequence, and finally the light is reflected to the lens module 4, so that the lens module 4 acquires the images collected through the first light inlet a.

The second light inlet b is set to be a rear viewing frame of the terminal, and the camera module has a rear camera function with such a structure. When the second reflector 3 is rotated to face the second light inlet b, the light passing through the second light inlet b is reflected by the second reflector 3 and finally transmitted to the lens module 4. The light passing through the second light inlet b is finally transmitted to the lens module 4 by one reflection.

Figure 9:
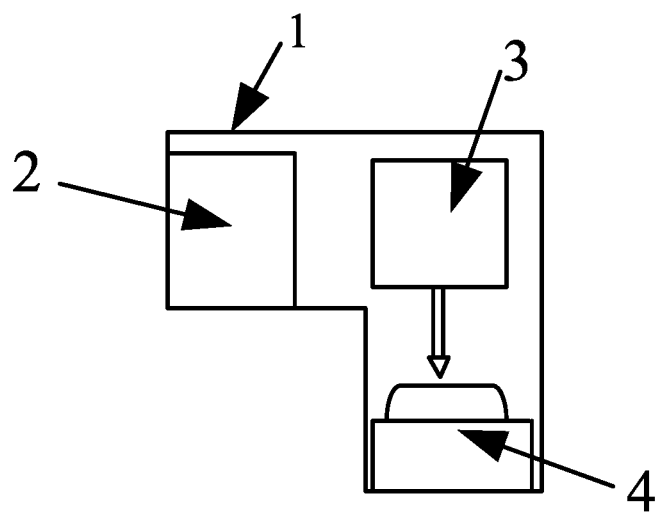
FIG. 9 shows a schematic front view of a camera module using a rear camera function according to some embodiments of the present disclosure.
Figure 10:
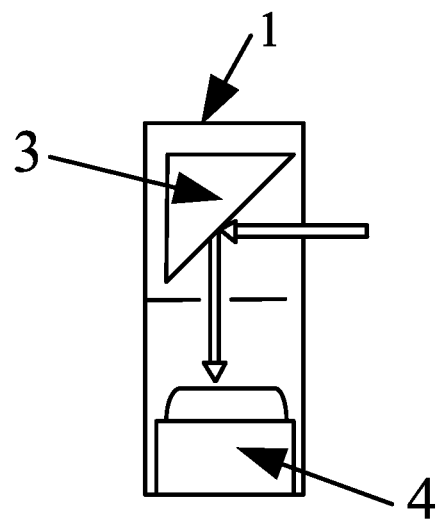
FIG. 10 shows a schematic right view of a camera module using a rear camera function according to some embodiments of the present disclosure.
Figure 11:
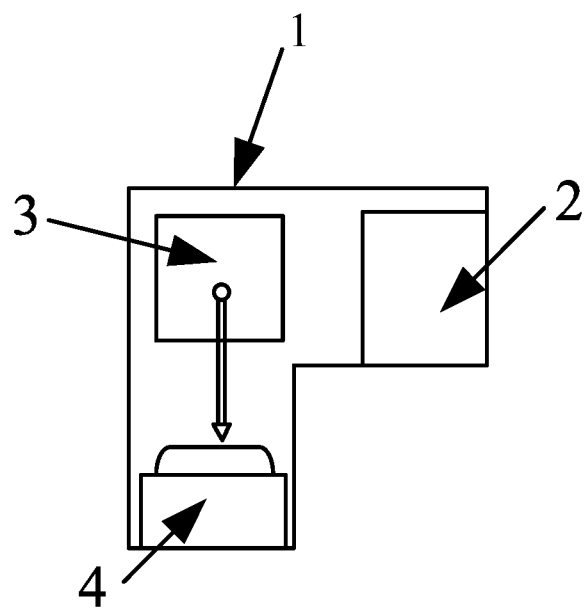
FIG. 11 shows a schematic rear view of a camera module using a rear camera function according to some embodiments of the present disclosure.

FIGS. 9 to 12 are schematic structural views of a camera module using a rear camera function according to some embodiments of the present disclosure. The directions of the arrows in FIGS. 9 to 12 are the directions of light transmission. As shown in FIGS. 9 to 12. The second light inlet b is set to be a rear viewing frame of the terminal, and the camera module has a rear camera function with such a structure. The second reflector 3 faces the second light inlet b and the lens module 4. After the light passes through the second light inlet b, the light is finally reflected to the lens module 4, so that the lens module 4 acquires the image collected through the second light inlet b.

The terminal provided with the above camera module, such as the mobile terminal, has the front camera function and the rear camera function. If the first light inlet a serves as the front viewing frame and the second light inlet b serves as the rear viewing frame, the first light inlet a may be arranged on a display screen side of the mobile terminal, and the second light inlet b may be arranged on a terminal rear cover side of the mobile terminal.

The camera module provided by the embodiments of the present disclosure alternately has the front camera function and the rear camera function in different configurations. The camera module has the same imaging effect in all directions. The camera module has the advantages of simple structure, low manufacturing complexity, high integration, high product yield, short manufacturing cycle, low cost, easy debugging and maintenance, etc.

In the assembly in the related technologies, one camera module is omitted for the high cost, which leads to reduction in functions of the product. In comparison, based on the structure of the camera module provided by the embodiments of the present disclosure, one camera module provided in the embodiments of the present disclosure is arranged in the terminal, and the front camera function and the rear camera function of the terminal can be alternately implemented, which greatly reduces the manufacturing cost of the terminal, and has the above advantages such as simple structure and high space utilization.

Since the first surface and the second surface are arranged opposite to each other, the first light inlet and the second light inlet are not on the same plane, which conforms to the design concept of arranging the front camera and the rear camera on two sides of a terminal housing, and conforms to the appearance requirements for the terminal at the present stage.

Some embodiments of the present disclosure further provide a method of controlling the camera module as described above. FIG. 13 is a flowchart of a method of controlling the camera module according to some embodiments of the present disclosure. As shown in FIG. 13, the method may include the steps as follows.

Step 101: controlling, by using the driving device, the second reflector to rotate to a first rotation position to make the second reflector face the first reflector, and collecting light passing through the first light inlet by using the lens module;

The camera module provided by the embodiments of the present disclosure includes the first reflector and the second reflector. The second reflector is connected to the driving device. The driving device controls the rotation of the second reflector. The second reflector is controlled to rotate by controlling the driving device, to enable the second reflector to face the first reflector. In this case, the light passing through the first light inlet is reflected to the second reflector by the first reflector firstly. And then, the light is finally reflected to the lens module by the reflection of the second reflector, so that the lens module collects the light passing through the first light inlet and acquires the images collected through the first light inlet.

Step 102: controlling, by using the driving device, the second reflector to rotate to a second rotation position to make the second reflector face the second light inlet, and collecting light passing through the second light inlet by using the lens module.

The second reflector is controlled to rotate by controlling the driving device, to enable the second reflector to face the second light inlet. In this case, the light passing through the second light inlet is reflected to the lens module by the second reflector, so that the lens module collects the light passing through the second light inlet and acquires the images collected through the second light inlet.

During operation, the collecting the light passing through the first light inlet by using the lens module may include: reflecting, by using the first reflector, the light passing through the first light inlet to the second reflector, and reflecting, by using the second reflector, the light which is reflected by the first reflector, to the lens module. The collecting the light passing through the second light inlet by using the lens module may include: reflecting, by using the second reflector, the light passing through the second light inlet to the lens module.

In the embodiments of the present disclosure, an angle between the first rotation position and the second rotation position may be 90°. In this case, the driving device can realize switching of the front camera function and the rear camera function by controlling the second reflector to rotate by 90°.

According to the method provided by the embodiments of the present disclosure, control of the camera module is achieved, which realizes collection of the light passing through the first light inlet and the light passing through the second light inlet by the lens module, and realizes the front camera function and the rear camera function of the terminal.

Some embodiments of the present disclosure also provide a mobile terminal. The mobile terminal includes the camera module provided by the embodiments of the present disclosure. The mobile terminal may be various, such as a mobile phone, a tablet computer, a notebook, and the like.

The mobile terminal provided with the above camera module has the advantages as follows.

The cost is reduced, since two camera modules are needed in the solution where regular front camera and rear camera are used, and the mobile terminal provided by the present disclosure adopts the single camera module which can still implement the functions of the front and rear cameras, thus reducing the number of camera modules and greatly reducing the cost of the terminal.

Spatial structure is optimized, in which case a spatial application of one camera module is saved, arrangement of more device applications is facilitated, and a thickness of the terminal is reduced to a certain extent.

Performance is improved. The front camera can achieve the same performance indicators as the rear camera, such as resolution, and optical image stabilization. In addition, the space saved can be used to increase the number of lenses to achieve multiple optical zoom.

Efficiency is improved. According to the conventional design requirements, a printed circuit board needs to reserve a position for connectors of the front camera and the rear camera; during an installing process, installing works of the front camera and the rear camera need to be completed respectively; and during a test process, test works of the front camera and the rear camera need to be completed respectively. With the mobile terminal provided by the present disclosure, the above operation processes can be simplified, and operational efficiency, such as installing efficiency and test efficiency, can be greatly improved.

The aforementioned are merely specific implementations of the present disclosure, and the protection scope of the present disclosure is not limited thereto. Any modifications or replacements that would easily occur to those skilled in the art, without departing from the technical scope disclosed in the present disclosure, should be encompassed in the protection scope of the present disclosure. Therefore, the protection scope of the present disclosure is to be determined by the protection scope of the claims.

What is claimed is:

1. A camera module, comprising a module support, a first reflector, a second reflector and a lens module, wherein the first reflector, the second reflector and the lens module are in the module support;
    wherein a first light inlet is arranged on a first sidewall of the module support, a second light inlet is arranged on a second sidewall of the module support, and the first sidewall and the second sidewall are opposite to each other;
    wherein the first reflector is arranged at the first light inlet, a mirror surface of the first reflector is at a first preset angle with the first sidewall, the second reflector is arranged at the second light inlet, a mirror surface of the second reflector is at a second preset angle with a first horizontal plane perpendicular to the first sidewall, the lens module is arranged on a second horizontal plane perpendicular to the first sidewall, and a lens of the lens module faces the mirror surface of the second reflector;
    wherein the second reflector is configured to rotate about a central axis of the lens module;
    wherein in the case that the mirror surface of the second reflector faces the first reflector, light passing through the first light inlet is sequentially reflected by the first reflector and the second reflector, and transmitted to the lens module; and
    wherein in the case that the mirror surface of the second reflector faces the second light inlet, light passing through the second light inlet is reflected by the second reflector and transmitted to the lens module.

2. The camera module according to claim 1, wherein the module support is provided with a third sidewall, the third sidewall is parallel to the first horizontal plane, and the lens module is arranged on the third sidewall.

3. The camera module according to claim 1, wherein the module support is L-shaped, the first reflector and the second reflector are in a horizontal support, and the lens module is in a vertical support.

4. The camera module according to claim 1, wherein the first preset angle is 45°, and the second preset angle is 45°.

5. The camera module according to claim 1, wherein the camera module is installed in a mobile terminal, the first light inlet is on a display screen side of the mobile terminal, and the second light inlet is on a terminal rear cover side of the mobile terminal.

6. A mobile terminal, comprising the camera module according to claim 1.

7. The mobile terminal according to claim 6, wherein the module support is provided with a third sidewall, the third sidewall is parallel to the first horizontal plane, and the lens module is arranged on the third sidewall.

8. The mobile terminal according to claim 6, wherein the module support is L-shaped, the first reflector and the second reflector are in a horizontal support, and the lens module is in a vertical support.

9. The mobile terminal according to claim 6, wherein the first preset angle is 45°, and the second preset angle is 45°.

10. The mobile terminal according to claim 6, wherein the first light inlet is on a display screen side of the mobile terminal, and the second light inlet is on a terminal rear cover side of the mobile terminal.

11. A method of controlling the camera module according to claim 1, comprising:
    rotating the second reflector to a first rotation position to make the second reflector face the first reflector, and collecting light passing through the first light inlet with the lens module; and
    rotating the second reflector to a second rotation position to make the second reflector face the second light inlet, and collecting light passing through the second light inlet with the lens module.

12. The method according to claim 11, wherein the collecting the light passing through the first light inlet with the lens module comprises:
    reflecting, with the first reflector, the light passing through the first light inlet, to the second reflector; and
    reflecting, with the second reflector, the light which is reflected by the first reflector, to the lens module; and
    wherein the collecting the light passing through the second light inlet with the lens module comprises:

reflecting, with the second reflector, the light passing through the second light inlet, to the lens module.

13. The method according to claim 11, wherein an angle between the first rotation position and the second rotation position is 90°.

\* \* \* \* \*